United States Patent

Absillis

(10) Patent No.: US 8,745,253 B2
(45) Date of Patent: Jun. 3, 2014

(54) TRIGGERING DHCP ACTIONS FROM IEEE 802.1X STATE CHANGES

(75) Inventor: Luc Absillis, Raleigh, NC (US)

(73) Assignee: Alcatel Lucent, Paris (FR)

( * ) Notice: Subject to any disclaimer, the term of this patent is extended or adjusted under 35 U.S.C. 154(b) by 1456 days.

(21) Appl. No.: 11/370,556

(22) Filed: Mar. 8, 2006

(65) Prior Publication Data

US 2007/0214270 A1 Sep. 13, 2007

(51) Int. Cl.
*G06F 15/177* (2006.01)
*G06F 15/173* (2006.01)
*G06F 15/16* (2006.01)
*H04L 29/12* (2006.01)

(52) U.S. Cl.
CPC ......... *H04L 61/2015* (2013.01); *H04L 61/2061* (2013.01); *H04L 61/2053* (2013.01)
USPC ............ 709/230; 709/221; 709/225; 709/228

(58) Field of Classification Search
USPC .................................. 709/206, 227, 228, 230
See application file for complete search history.

(56) References Cited

U.S. PATENT DOCUMENTS

| | | | | |
|---|---|---|---|---|
| 6,782,422 B1 * | 8/2004 | Bahl et al. | ...................... | 709/224 |
| 7,051,089 B1 * | 5/2006 | Johnson et al. | ............... | 709/220 |
| 7,072,346 B2 * | 7/2006 | Hama | ...................... | 370/395.53 |
| 2001/0028660 A1 * | 10/2001 | Carolan et al. | ................ | 370/466 |
| 2001/0047484 A1 * | 11/2001 | Medvinsky et al. | .......... | 713/201 |
| 2004/0047320 A1 * | 3/2004 | Eglin | ............................ | 370/338 |
| 2004/0208151 A1 * | 10/2004 | Haverinen et al. | ............ | 370/338 |
| 2004/0214576 A1 * | 10/2004 | Myers et al. | .................. | 455/445 |
| 2005/0013280 A1 * | 1/2005 | Buddhikot et al. | ........... | 370/349 |
| 2005/0232228 A1 | 10/2005 | Dharanikota et al. | | |
| 2006/0112269 A1 * | 5/2006 | Uh et al. | ....................... | 713/166 |
| 2006/0123118 A1 * | 6/2006 | Choe et al. | .................... | 709/227 |
| 2006/0268856 A1 * | 11/2006 | Voit et al. | ...................... | 370/389 |

FOREIGN PATENT DOCUMENTS

WO 2005/104500 A1 11/2005

OTHER PUBLICATIONS

Tschofenig, et al.; Bootstrapping RFC3118 Delayed DHCP Authentication Using EAP-Based Network Access Authentication; Dynamic Host Configuration; IETF Internet Draft; Feb. 2006; pp. 1-28 (draft-yeagin-eap-boot-rfc3118-02.txt).

* cited by examiner

*Primary Examiner* — Ario Etienne
*Assistant Examiner* — Blake Rubin
(74) *Attorney, Agent, or Firm* — Capitol Patent & Trademark Law Firm, PLLC

(57) ABSTRACT

A client device obtains an Internet Protocol (IP) address in response to completion of an authentication protocol process. The IP address can be provided in accordance with, for example, the dynamic host configuration protocol (DHCP). The authentication protocol can be, for example, that which is defined by the IEEE 802.1x standard. When a client device detects completion of the 802.1x authentication process, it issues a DHCP request to the network.

17 Claims, 4 Drawing Sheets

TRIGGERING DHCP ACTIONS FROM IEEE 802.1X STATE CHANGES

BACKGROUND OF THE INVENTION

1. Field of the Invention

The present invention relates generally to digital networks and, more specifically, to digital networks that employ authentication protocols, such as those that provide high-speed Internet, telephone and television services to customers' homes.

2. Description of the Related Art

Digital service providers are using their networks to deliver an ever-broadening array of services to their subscribers' or customers' homes or other premises. Whereas once a digital subscriber line (DSL) was used solely to provide subscribers with Internet Web and e-mail access, today's service providers wish to bundle Internet service with voice (telephony) and video (television) services. (Such bundled Internet, voice and video service is sometimes colloquially referred to as "triple play" service.) Optical fiber-based technologies, such as the passive optical network (PON), offer perhaps even more promising alternatives to DSL. Fully optical networks, which some have referred to as "fiber-to-the-premises" (FTTP), are increasingly being developed and deployed.

As the complexity and value of digital services have increased, so has the need for security and convenience. The longstanding username-and-password login procedure for providing network security is increasingly considered unacceptable. More automated authentication alternatives have been proposed, and the IEEE 802.1x standard for port-based network access control has emerged as the most popular. The IEEE 802.1x standard ties the Extensible Authentication Protocol (EAP) to the local area network (LAN) environment and thus is sometimes referred to as EAP-over-LAN (EAPOL). "Authentication" refers generally to the process by which a network verifies that a client device attempting to access the network is authorized to access the network and blocks access if the authentication process indicates that the client device lacks authorization.

More specifically, the 802.1x or EAPOL authentication process begins with a client device (referred to in this context as a "supplicant") attempting to connect with a node of the network to which the client device desires access (referred to in this context as an "access node" or "authenticator"). The access node responds by enabling a port for passing only EAP packets received from the client device to an authentication server located on the network side of the access node. The access node blocks or filters out all non-EAP data packets that the client device may transmit, until the access point can verify the client device's identity using local authentication or a backend authentication server (e.g., a RADIUS server). Once authenticated, the access node opens the client device's port for other types of packets.

In a network of the type described above, through which a service provider delivers services to subscribers or customers, the client device that participates in the 802.1x authentication process is commonly referred to as customer premises equipment (CPE). An increasingly popular type of CPE, especially in networks that offer triple play service, is known as a residential gateway. A residential gateway sets up a sub-network or subscriber network to which a user can connect a variety of devices, such as computers, (television) set-top boxes, voice-over-Internet Protocol (VoIP) telephones, IP fax machines, etc.

A client device, such as a residential gateway or other CPE, must have an Internet Protocol (IP) address to operate on the network. In IP-based networks that provide Internet access to subscribers through, for example, a DSL, the most common method of providing a client device with an IP address uses the dynamic host configuration protocol (DHCP). DHCP enables a network device to extract its configuration from a server (the "DHCP server"), even though the DHCP server may have no exact information about the device until it requests the information. The IP address remains valid for some predetermined "lease period," after which it expires, and the client device is required to obtain a new IP address from the DHCP server. The client device commonly obtains an IP address in this manner when the user first powers it up, when the client device re-boots, or when the lease period expires.

A media access control (MAC) address is a number that uniquely identifies a computer or other device that has a network (typically, Ethernet) interface. It is sometimes referred to as a hardware address or physical address. Unlike the IP address, it includes no indication of where the device is located. Each (IEEE 802-compliant) network device worldwide has a unique 48-bit MAC address, where the first 24 bits indicate the manufacturer and the last 24 bits are analogous to a product serial number, i.e., a unique number assigned by the manufacturer for each manufactured card/controller chip unit. A network node in the path between the CPE and the service provider's network (e.g., an access node) commonly maintains an IP address table that relates or maps each client device's MAC address to its IP address. The network node learns the entries in this table by snooping the IP address assignment protocol. The network node maintains the table for reasons that include preventing spoofing, i.e., intruding in a network by transmitting packets bearing an IP address obtained in an unauthorized manner. For this reason, such a table is sometimes referred to as an anti-spoofing table. Such a table is also used for the proxy-Address Resolution Protocol (ARP).

For network security reasons, a network node may block communications from a client device, such as a residential gateway or other CPE, if the network node determines that a device IP or MAC address has changed from that which had been previously identified (and stored in the table), as it suggests that an intruder is attempting to spoof an authenticated device. Occasionally, however, malfunctions or other events in the network (e.g., a network node or card thereof was reset) result in a client device that has previously been authenticated losing its ability to communicate because the malfunction or other event caused the information stored in the tables to be lost, corrupted or otherwise unusable. It is therefore possible for a network node to block communications from a client device, such as a residential gateway, that was previously authenticated and authorized. Although the client device may participate in another 802.1x authentication if challenged by the network server, it will continue to use the same IP address it had been using before the problem occurred until such time as the lease period expires or the user manually re-boots the client device (e.g., turns the power off and then on again or presses a "restart" button) or otherwise triggers DHCP renewal. One solution that has been suggested is to revise or extend the DHCP standard to provide for an additional DHCP message that would be known as "DHCP RENEW." In accordance with this proposal, a DHCP server could transmit a DHCP renew message to a client device to force the client device to renew its IP address. Nevertheless, security concerns and other issues have slowed the adoption of this suggestion.

There is presently no secure, straightforward solution in the art for ensuring continuation of proper operation following certain events in networks in which IEEE 802.1x authentication is used for security and DHCP is used to configure client devices. The present invention addresses these problems and deficiencies and others in the manner described below.

SUMMARY OF THE INVENTION

The present invention relates to providing a client device with an Internet Protocol (IP) address in response to completion of an authentication protocol process. The IP address can be provided in accordance with, for example, the dynamic host configuration protocol (DHCP). The authentication protocol can be, for example, that which is defined by the IEEE 802.1x standard, also referred to as Extensible Authentication Protocol (EAP) over Local Area Network (LAN) or "EAPOL," or similar authentication protocol that involves an exchange of messages between the client device and a network to which the client device seeks access. Thus, in an exemplary embodiment of the invention, a client device detects completion of the EAPOL authentication process and, in response, issues a DHCP request to the network. Accordingly, in such an embodiment a DHCP server in the network issues the IP address, which is then forwarded to the client computer.

In an exemplary embodiment of the invention, the DHCP process is, in effect, linked with the EAPOL process. Thus, if a malfunction or other event in the network results in a client device that has previously been authenticated to lose its ability to communicate with the network, when the access node thereafter initiates authentication of the client device, the client device responds by not only proceeding with authentication but also by requesting a new IP address. Performing the DHCP process upon restoration of service or at such other time as the client device is authenticated ensures that tables or other IP address-related data maintained by a network node that may have been corrupted, lost or otherwise rendered unusable reflect currently valid associations between IP addresses and other data, such as media access control (MAC) addresses.

DETAILED DESCRIPTION

Figure 1:
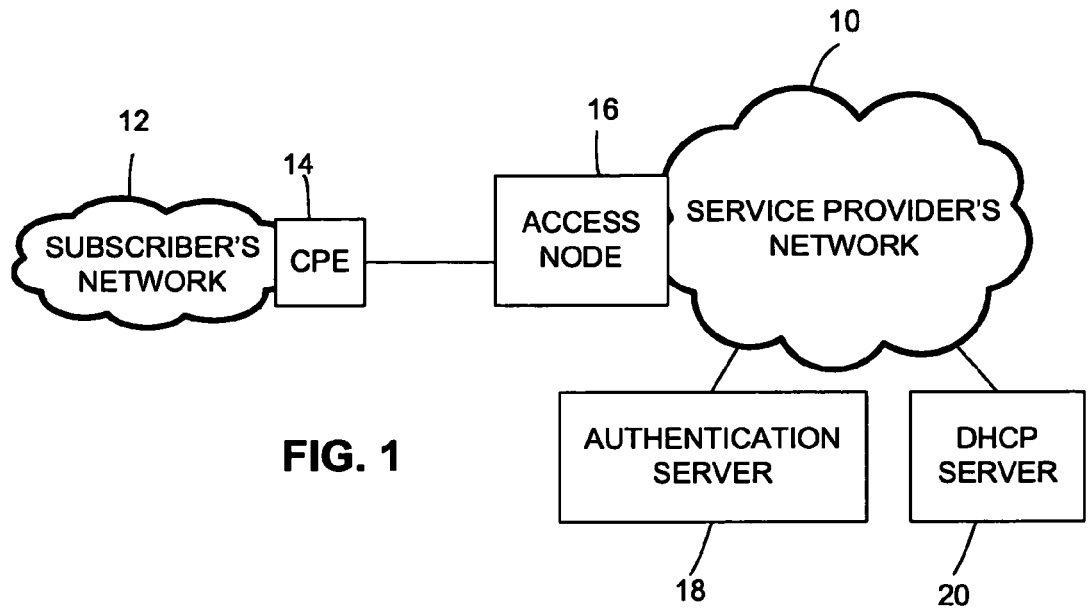
FIG. 1 is a generalized block diagram of a network of a type that carries data between a service provider and a subscriber.

As illustrated in FIG. 1, in an exemplary embodiment of the invention, a service provider (business entity) operates a service provider network 10 that provides subscribers with services such as Internet (Web, e-mail, etc.) access, voice (telephony) communication, video (television) entertainment, etc. The subscribers are commonly referred to as "customers" of the service provider, as they typically pay the service provider for such services in accordance with a suitable arrangement. Such a service provider network 10 is described for purposes of illustration, and the arrangement on the server side of the overall client-server network can be of any other suitable type in other embodiments of the invention.

Each subscriber, who can be a homeowner, business, or other person or entity, has a subscriber network 12. Subscriber network 12 can be a local area network (LAN) in a residence or other premises. Subscriber network 12 networks together various subscriber-operated devices, such as computers, (television) set-top boxes, voice-over-Internet Protocol (VoIP) telephones, IP fax machines, etc., (not shown individually for purposes of clarity). Customer premises equipment (CPE) 14 links or connects subscriber network 12 to service provider network 10. CPE 14 can comprise, for example, a device commonly referred to as a residential gateway, or any other suitable device through which subscriber-operated devices communicate with service provider network 10. Such a subscriber network 12 is described for purposes of illustration, and the arrangement on the client side of the overall client-server network can be of any other suitable type in other embodiments of the invention.

CPE 14 is typically provided by or at least pre-approved by the service provider and thus considered "authorized" equipment. Thus, in operation, service provider network 10 performs authentication upon CPE 14 in the conventional manner to verify that it is the expected, authorized equipment and not some other (unauthorized) equipment that has been connected in place of CPE 14. This authentication process can conform to the well-known IEEE 802.1x authentication protocol, which is also referred to as Extensible Authentication Protocol (EAP) Over Local Area Network (LAN) or "EAPOL."

Service provider network 10 includes an access node 16, an authentication server 18 and a dynamic host configuration protocol (DHCP) server 20. Service provider network 10 can include more access nodes 16 and other servers and devices of the types that are commonly included in such a network, but only one network node 16, one authentication server 18, and one DHCP server 20 are shown in FIG. 1 for purposes of clarity. Access node 16 can be, for example, a digital subscriber line access multiplexer (DSLAM). In embodiments involving other access technologies or network technologies it could be any other suitable type of network node, such as an optical network terminator (ONT).

As known in the art, and as described below in further detail, a communication conversation (i.e., an exchange of messages) occurs between CPE 14 and access node 16 and between access node 16 and authentication server 18 during the authentication process. As also known in the art, DHCP server 20 provides an IP address to CPE 14 in response to a request received from CPE 14.

Figure 2:
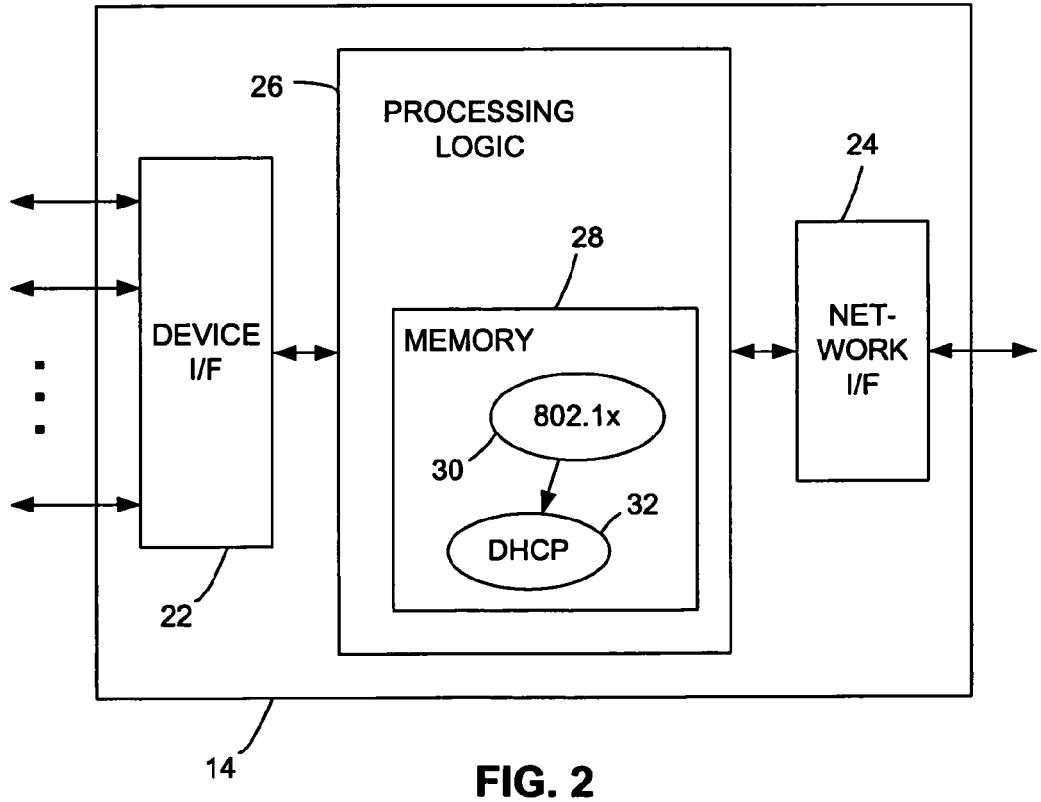
FIG. 2 is a generalized block diagram of customer premises equipment of the network of FIG. 1 in accordance with an exemplary embodiment of the invention.

CPE 14 can have the structure illustrated in generalized form in FIG. 2, including a device interface 22 to which one can connect one or more subscriber-operated devices, a network interface 24 through which one can connect CPE 14 to server provider network 10 (e.g., through a DSL line, optical fiber terminal, etc., on the premises), and processing logic 26. Processing logic 26 can comprise any suitable "logic," i.e., hardware, software, firmware, or some combination thereof, including processors and data storage, of the types commonly included in such customer premises equipment.

Depicted for purposes of illustration and convenience as residing in a memory 28 of processing logic 26 are IEEE 802.1x (EAPOL) authentication logic 30 and DHCP logic 32. These are conventional software elements that effect the CPE end of the authentication and (IP) configuration processes, respectively. Although these elements and their functions are by themselves well-known and therefore not described herein in detail, the linking of the DHCP process to the authentication process (as indicated by the arrow from authentication logic 30 to DHCP logic 32 in FIG. 2) is an important aspect of the invention. In view of the teachings herein, persons skilled in the art to which the invention relates will readily be capable of linking authentication logic 30 and DHCP logic 32 with suitable software or other logic to effect the methods described below. Note that the computer-usable code or similar logic, as resident in memory 28 for execution or otherwise carried on a computer-usable medium (e.g., a removable or fixed storage disk), represents a "computer program product."

Figure 3:
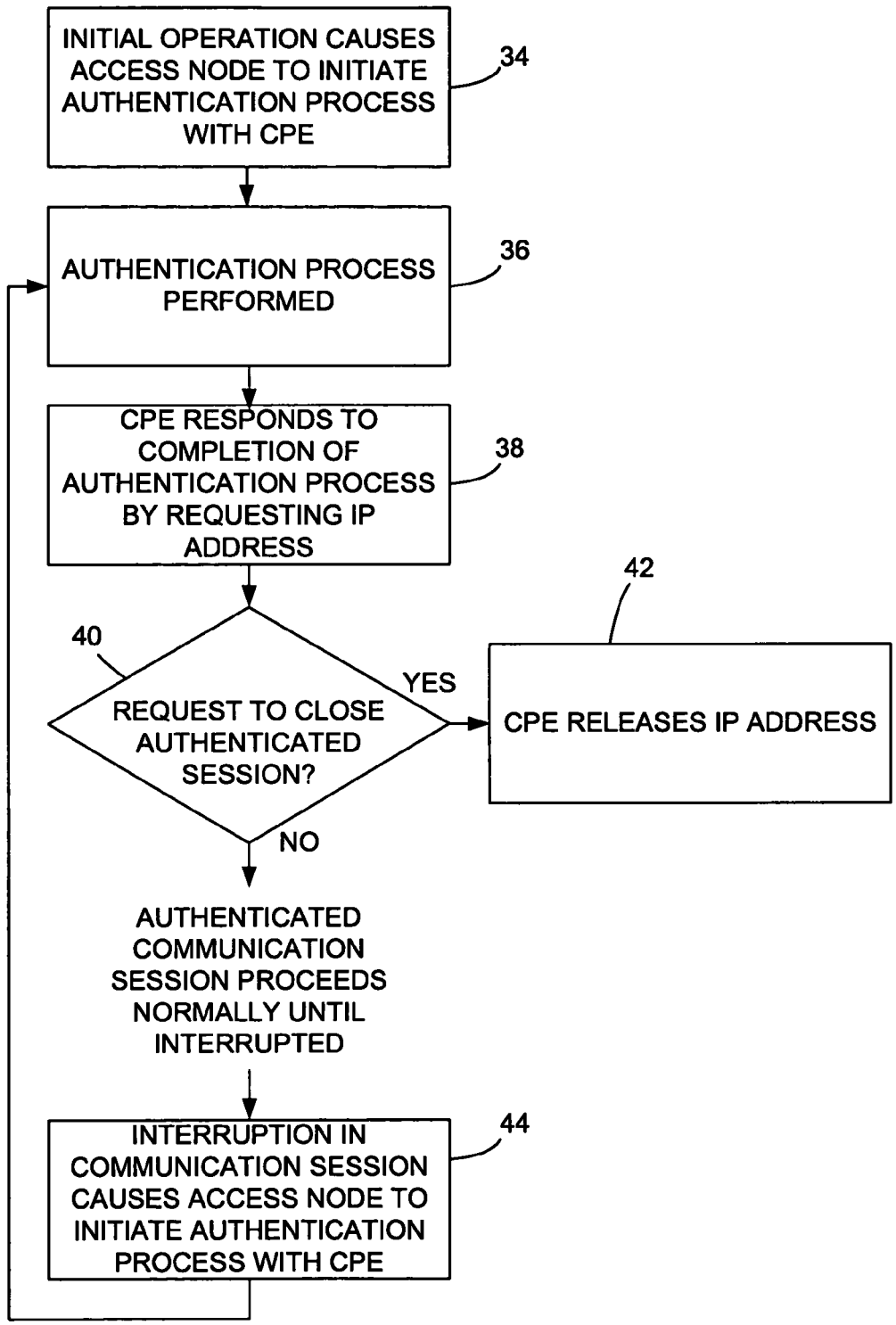
FIG. 3 is a flow diagram illustrating a method of operation of the network of FIGS. 1-2.

An exemplary method of operation of the above-described system and network is illustrated in FIG. 3. At step 34, initial operation of CPE 14 begins when power is applied or a user otherwise causes it to restart, boot up, etc. The presence of CPE 14 in the network causes access node 16 to initiate an authentication process. At step 36, the authentication process is performed. As known in the art and as described below in further detail, the authentication process involves an exchange of messages among CPE 14, access node 16, and authentication server 18 (see FIG. 1). At step 38, CPE 14 responds to completion of the authentication process by requesting an IP address from the network (e.g., using DHCP, as described below in further detail). Once CPE 14 has acquired an IP address, CPE 14 operates within service provider network 10 in what is sometimes referred to as "an 802.1x session" or an "authenticated session." The session continues until CPE 14 terminates or closes it (e.g., the user powers off CPE 14), as indicated by step 40, or communication is undesirably interrupted (e.g., by a malfunction). If the session is terminated normally, CPE 14 releases its IP address, as indicated by step 42 and no longer uses it.

During the session, access node 16 may maintain a table (not shown) that relates the IP addresses assigned to CPE 14 and any other client devices with which it communicates to other information, such as media access control (MAC) addresses. As known in the art, such tables are used for address resolution and to resist spoofing. If access node 16 determines that a device IP or MAC address associated with CPE 14 has changed from that which had been previously identified (and stored in the table), it blocks communication with CPE 14 for security reasons. Nevertheless, it has been recognized in accordance with the present invention that spoofing is not the only reason why the IP or MAC address of a client device may not match that which was stored in the table or otherwise appear to access node 16 to have changed. Malfunctions and instances in which the communication session is interrupted can corrupt the information in the tables or otherwise cause the information in the tables to be lost or unusable. If this occurs, access node 16 will not recognize CPE 14 as having previously been authenticated and will therefore initiate the authentication process, as indicated by step 44. The present invention links the DHCP process to the authentication process such that performing the authentication process (step 36) causes or triggers the DHCP process to be performed. Performing the DHCP process following an event that could possibly have corrupted the table information ensures that the IP address provided to CPE 14 is also stored in the table and properly associated with the MAC address of CPE 14 so that the new session will not be impeded.

Figure 4:
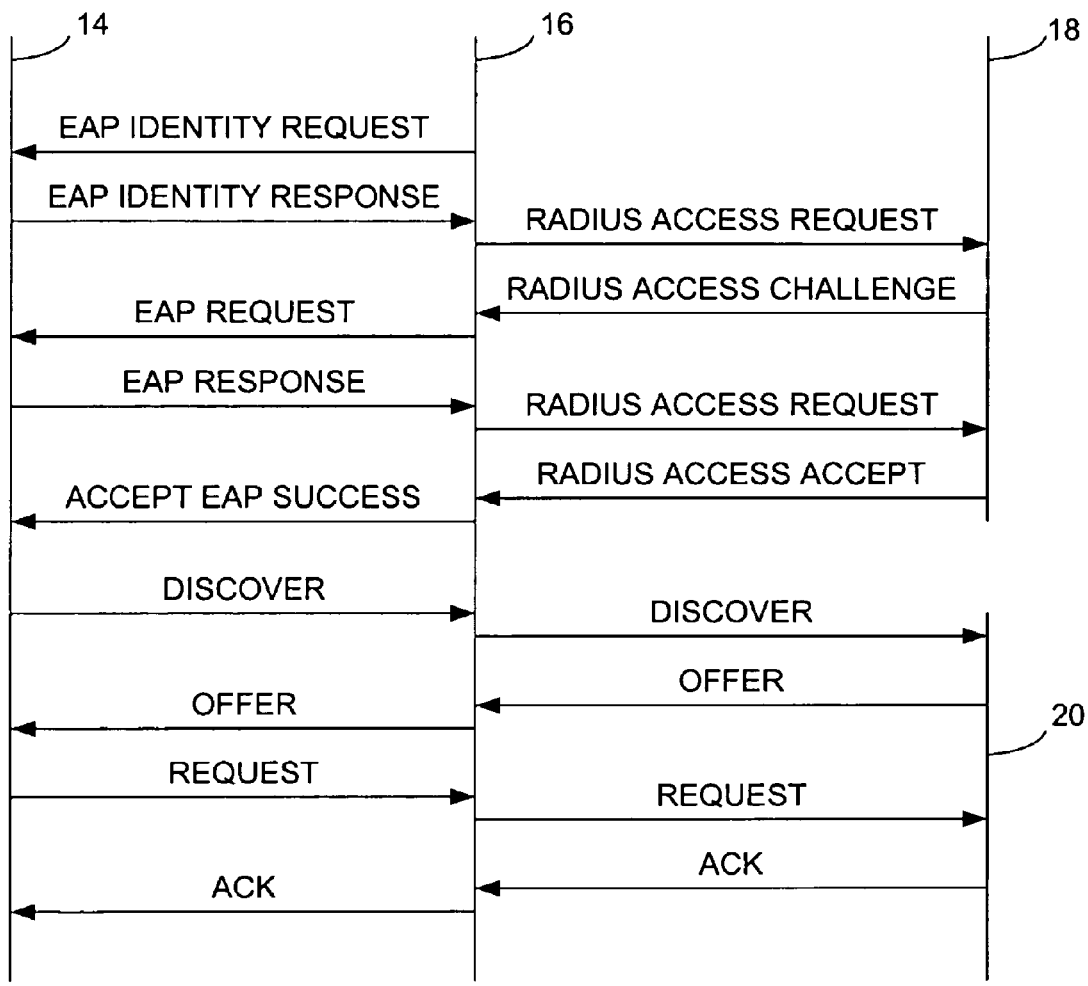
FIG. 4 is a communication sequence diagram illustrating operation in an embodiment in which the authentication is EAPOL, and DHCP is used to obtain the IP address following initial operation.
Figure 5:
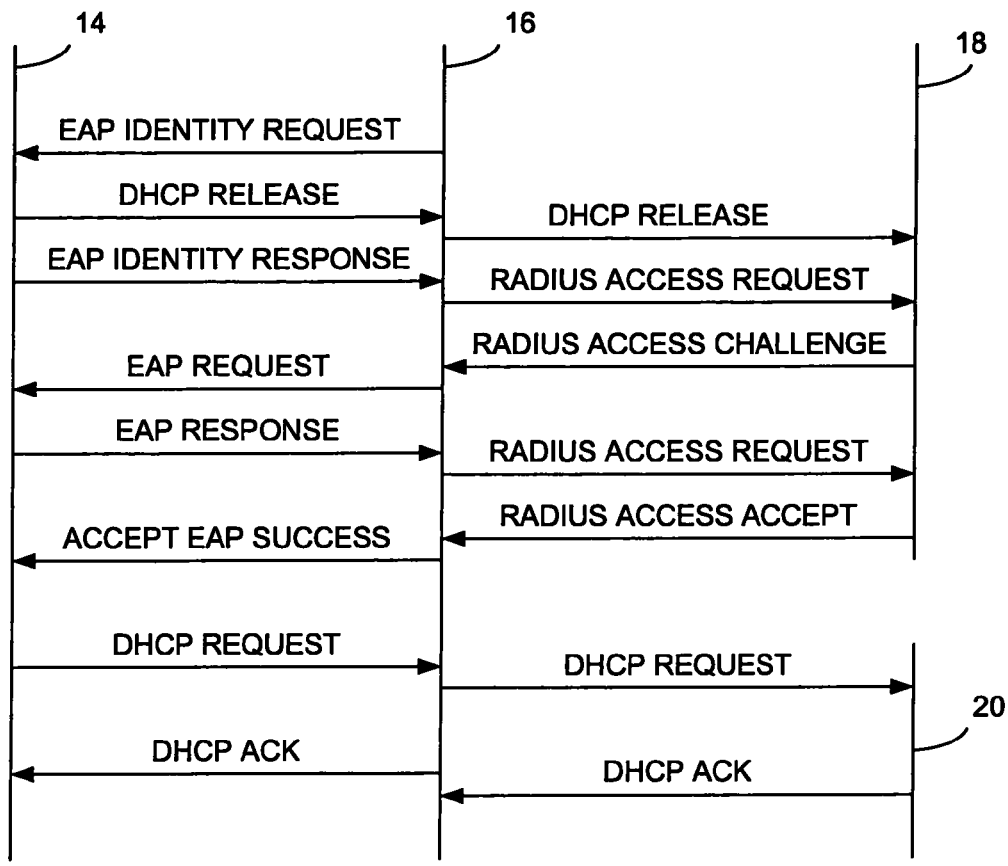
FIG. 5 is a communication sequence diagram illustrating operation in an embodiment in which the authentication is EAPOL, and DHCP is used to obtain the IP address following an interruption of an authenticated communication session.
Figure 6:
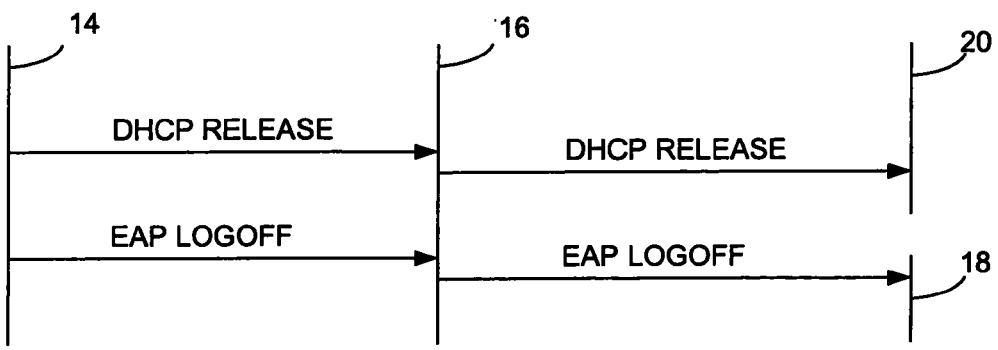
FIG. 6 is a communication sequence diagram illustrating operation in an embodiment in which the authentication is EAPOL, and DHCP is used to obtain the IP address following intentional termination of an authenticated communication session.

The sequence of communications that occurs when the above-described method is performed is illustrated in FIGS. 4-6. With reference to FIG. 4, upon initial operation, access node 16 sends an EAP Identity Request message to CPE 14. CPE 14 sends an EAP Identity Response message to access node 16 in response to the EAP Identity Request message. Access node 16 in turn forwards the Identity Response information, encapsulated in a RADIUS Access Request message, to authentication server 18. RADIUS is a well-known authentication, authorization and accounting protocol that is used to control network access. As known in the art, a RADIUS authentication server can use any of a number of well-known methods to verify the supplicant's (in this instance, CPE 14) credentials. Although EAP and RADIUS protocols are used in the exemplary embodiment of the invention, in other embodiments other protocols and the messages associated with those protocols may be suitable. In response to the RADIUS Access Request message, authentication server 18 returns a RADIUS Access Challenge message.

Access node 16 forwards the information encapsulated in the RADIUS Access Challenge message, as an EAP Request to CPE 14. CPE 14 sends an EAP Response message to access node 16 in response to the EAP Request message. Access node 16 in turn forwards the EAP Response information, encapsulated in a RADIUS Access Request message, to authentication server 18. In response to the RADIUS Access Request message, authentication server 18 returns a RADIUS Access Accept message (in an instance in which it has determined that CPE 14 has the credentials to be considered valid or authentic; otherwise, authentication server 18 would return a RADIUS Access Reject message). Access node 16 forwards the information encapsulated in the RADIUS Access Accept message as an Accept EAP Success message to CPE 14. At that point, the authentication process is generally considered completed, and CPE 14 is permitted to access service provider network 10.

As described above, CPE 14 is configured with logic that causes completion of the authentication process to trigger initiation of the DHCP process. Accordingly, as shown in FIG. 4, CPE responds to the Accept EAP Success message by initiating the DHCP process. Accordingly, CPE 14 sends a Discover message to access node 16, which forwards it to DHCP server 20. DHCP server 20 responds to the Discover message by sending an Offer message to access node 16, which forwards it to CPE 14. CPE 14 responds to the Offer message by sending a Request message to access node 16, which forwards it to DHCP server 20. In response to the Request message, DHCP server 20 sends an Acknowledge (ACK) message to access node 16, which forwards it to CPE 14. As known in the art, the ACK message contains the requested IP address. Although not shown for purposes of clarity, access node 16 would also use the IP address contained in the ACK message to fill in the table that associates the IP address of CPE 14 with its MAC address.

As illustrated in FIG. 5 and as generally described above with regard to FIG. 3, if the session is interrupted, access node 16 may not recognize CPE 14 and may therefore initiate the authentication process. In such an instance, the sequence of communications is essentially the same as described above with regard to FIG. 4, except that CPE 14 sends a DHCP Release message, indicating to DHCP server 20 that it is no longer using the previously obtained IP address, before requesting another IP address from DHCP server 20.

If instead of the session ending as a result of undesirable interruption in communication, the session ends because CPE 14 initiated termination of the session, CPE 14 similarly sends a DHCP Release message, before sending an EAP Logoff message, as illustrated in FIG. 6. Although the system will operate without CPE 14 indicating that it is no longer using the IP address and without sending an EAP Logoff message, the coordination of a DHCP message with an EAP message is consistent with the theme of the invention, which links the DHCP process to the authentication process.

It will be apparent to those skilled in the art that various modifications and variations can be made to this invention without departing from the spirit or scope of the invention. Thus, it is intended that the present invention cover the modifications and variations of this invention provided that they come within the scope of any claims and their equivalents. With regard to the claims, no claim is intended to invoke the sixth paragraph of 35 U.S.C. Section 112 unless it includes the term "means for" followed by a participle.

What is claimed is:

1. A method for providing an Internet Protocol (IP) address to a client device in a data network, comprising:
   detecting completion of an authentication protocol process, comprising an exchange of authentication messages between the client device and a network node, after the client device has lost communication with the data network;
   issuing a release message indicating that the client device is no longer using a previously provided IP address; and
   issuing a request for a new IP address in response to the detection of the completion of the authentication protocol process after the client device has lost communication with the data network.

2. The method claimed in claim 1, wherein the client device is a residential gateway.

3. The method claimed in claim 1, wherein the authentication protocol comprises Extensible Authentication Protocol Over Local Area Network (EAPOL).

4. The method claimed in claim 3, wherein the request comprises a dynamic host configuration protocol (DHCP) request message.

5. The method claimed in claim 1, further comprising the step of preventing further use of the new IP address in response to termination of an authenticated session.

6. The method claimed in claim 5, wherein termination of an authenticated session comprises an EAP logoff.

7. A method for continuing a network session following an interruption in communication between a network node and a client device, comprising:
   receiving an acceptance message from the network node upon completion of an authentication protocol process following the interruption;
   issuing a release message indicating that the client device is no longer using a previously provided IP address; and
   issuing, from the client device, a dynamic host configuration protocol (DHCP) request for a new IP address in response to completion of the authentication protocol process following the interruption.

8. The method claimed in claim 7, wherein the client device is a residential gateway.

9. The method claimed in claim 7, wherein the authentication protocol comprises Extensible Authentication Protocol Over Local Area Network (EAPOL).

10. The method claimed in claim 7, wherein the acceptance message comprises an EAP Success message.

11. The method claimed in claim 9, further comprising the step of the client device preventing further use of the new IP address in response to termination of an authenticated session.

12. The method claimed in claim 11, wherein termination of an authenticated session comprises an EAP logoff.

13. A computer program product usable by client device for obtaining an Internet Protocol (IP) address, the computer program product comprising a non-transitory computer-medium on which is carried in computer-usable form:
   a first code portion for detecting completion of an authentication protocol process, comprising an exchange of authentication messages between the client device and a network node, after the client device has lost communication with the data network;
   a second code portion for causing the client device to issue a release message indicating that the client device is no longer using a previously provided IP address; and
   a third code portion for causing the client device to issue a request for a new IP address in response to the detection of the completion of the authentication protocol process after the client device has lost communication with the data network.

14. The non-transitory computer program product claimed in claim 13, wherein the authentication protocol comprises Extensible Authentication Protocol Over Local Area Network (EAPOL).

15. The non-transitory computer program product claimed in claim 14, wherein the request comprises a dynamic host configuration protocol (DHCP) request message.

16. The non-transitory computer program product claimed in claim 13, further comprising the a fourth code portion for preventing further use of the IP address in response to termination of an authenticated session.

17. The non-transitory computer program product claimed in claim 16, wherein termination of an authenticated session comprises an EAP logoff.

* * * * *